United States Patent
Gronowski et al.

(10) Patent No.: US 7,452,936 B2
(45) Date of Patent: Nov. 18, 2008

(54) ADHESIVE COMPOUNDS OF BUTYL-TYPE RUBBER

(75) Inventors: Adam Gronowski, Sarnia (CA); Stephan Glander, Leverkusen (DE)

(73) Assignee: Lanxess, Inc., Sarnia, Ontario (CA)

( * ) Notice: Subject to any disclaimer, the term of this patent is extended or adjusted under 35 U.S.C. 154(b) by 0 days.

(21) Appl. No.: 10/577,888

(22) PCT Filed: Oct. 2, 2003

(86) PCT No.: PCT/CA03/01518

§ 371 (c)(1),
(2), (4) Date: Mar. 23, 2007

(87) PCT Pub. No.: WO02/16452

PCT Pub. Date: Feb. 28, 2002

(65) Prior Publication Data

US 2007/0276084 A1    Nov. 29, 2007

(30) Foreign Application Priority Data

Oct. 3, 2002    (CA) .................................. 2406432

(51) Int. Cl.
*A61K 9/16*    (2006.01)
(52) U.S. Cl. .................................. 524/543; 525/332.8
(58) Field of Classification Search ................. 524/543; 525/332.8
See application file for complete search history.

(56) References Cited

U.S. PATENT DOCUMENTS

| | | | |
|---|---|---|---|
| 4,524,187 A | 6/1985 | Greco et al. | 525/332.1 |
| 5,385,965 A | 1/1995 | Bernard et al. | 524/272 |
| 2001/0041780 A1* | 11/2001 | Gronowski | 526/226 |
| 2003/0187173 A1 | 10/2003 | Kaszas | 526/339 |
| 2004/0014904 A1 | 1/2004 | Gronowski et al. | 525/387 |

FOREIGN PATENT DOCUMENTS

| | | |
|---|---|---|
| CA | 2 316 741 | 2/2002 |
| CA | 2 386 628 | 11/2003 |
| RU | 2 130 948 | 5/1999 |
| WO | WO 02/16452 A1 * | 2/2002 |

OTHER PUBLICATIONS

J. Macromol. Sci.-Chem., A1(6) pp. 995-1004 (1967); J.P Kennedy and R.G. Squires, "Contributions to the Mechanism of Isobutene Polymerization. VII. Effect of HCl and Chloroethyl Benzene and a Brief Summary of the Data".
Ullmann's Encyclopedia of Industrial Chemistry (Fifth, Completely Revised Edition, vol. A23; Editors Elvers et al., 290-292 "Rubber, 3. Synthetic", 1993.
"Cationic Polymerization of Olefins: A Critical Inventory" by Joseph P. Kennedy (John Wiley & Sons, Inc, © 1975, 10-12.
Encyclopedia of Polymer Science and Engineering, vol. 4, p. 66 et seq. "Compounding", 1986.
Encyclopedia of Polymer Science and Engineering, vol. 17, p. 666 et seq. "Vulcanization", 1989.

* cited by examiner

*Primary Examiner*—Mark Eashoo
*Assistant Examiner*—Angela C Scott
(74) *Attorney, Agent, or Firm*—Michael A. Miller

(57) ABSTRACT

The present invention relates to a substantially gel-free sealant or adhesive compound comprising butyl-type polymer without any conjugated aliphatic diene in its composition having an average molecular weight Mn of more than 20,000 g/mol and containing less than 15 wt. % of solid matter insoluble in boiling cyclohexane under reflux for 60 min., and a self-supporting shaped article comprising said compound optionally layered on or interposed between one or more supporting means as well as a tape comprising said substantially gel-free compound optionally layered on or interposed between one or more supporting means. In still another of its aspects, the present invention relates to an adhesive composition comprising said substantially gel-free compound. In still another of its aspects, the present invention relates to a sealant composition comprising said substantially gel-free compound.

8 Claims, No Drawings

ADHESIVE COMPOUNDS OF BUTYL-TYPE RUBBER

FIELD OF THE INVENTION

The present invention relates to a substantially gel-free sealant or adhesive compound comprising butyl-type polymer having an average molecular weight $M_n$ of more than 20,000 g/mol and containing less than 15 wt. % of solid matter insoluble in boiling cyclohexane under reflux for 60 min. In another of its aspects, the present invention relates to a self-supporting shaped article comprising said compound optionally layered on or interposed between one or more supporting means. In still another of its aspects, the present invention relates to a tape comprising said substantially gel-free compound optionally layered on or interposed between one or more supporting means. In still another of its aspects, the present invention relates to an adhesive composition comprising said substantially gel-free compound. In still another of its aspects, the present invention relates to a sealant composition comprising said substantially gel-free compound.

BACKGROUND OF THE INVENTION

Butyl rubber is known for its excellent insulating and gas barrier properties. Generally, commercial butyl polymer is prepared in a low temperature cationic polymerization process using Lewis acid-type catalysts, of which a typical example is aluminum trichloride. The process used most extensively employs methyl chloride as the diluent for the reaction mixture and the polymerization is conducted at temperatures on the order of less than −90° C., resulting in production of a polymer in a slurry of the diluent. Alternatively, it is possible to produce the polymer in a diluent which acts as a solvent for the polymer (e.g., hydrocarbons such as pentane, hexane, heptane and the like). The product polymer may be recovered using conventional techniques in the rubber manufacturing industry.

Adhesives (glues) are substances capable of forming and maintaining a bond between two surfaces, and sealants (caulks) are substances used to fill gaps or joints between two materials to prevent the passage of liquids, solids or gases. These two classes of materials are often considered together because quite frequently a given formulation performs the both functions.

Butyl sealants are available as one-component solvent evaporation curing products and as thermoplastic hot melts. There is no curing process, the compound gets its functionality through solvent loss and/or a decrease in temperature. When a sealant is applied, the solvent evaporates or migrates into porous substrates and the tough, rubbery compound is left in place. This is in contrast to other sealant types that cure chemically.

It is known to use a commercial pre-cross-linked butyl rubber such as commercially available Bayer® XL-10000 (or, formerly XL-20 and XL-50) that will add additional strength to the sealant/adhesive. XL-10000 is partially cross-linked with divinylbenzene already in the polymerization stage.

While said commercial pre-cross-linked polymers exhibit excellent properties in many applications, they have a gel content of at least 50 wt. % which sometimes makes the even dispersion of fillers and additives normally used during compounding difficult. This increases the likelihood of inhomogeneous areas within the rubbery article, rendering its physical properties inferior and unpredictable. Also, the Mooney viscosity of this rubber is high, usually 60-70 units (1'+8'@125° C.) which may cause significant processing difficulties, especially in a mixing stage.

Processability-improving polymers are often added to the pre-cross-linked butyl rubber to overcome some of these problems. Such polymers are particularly useful for improving the mixing or kneading property of a rubber composition. They include natural rubbers, synthetic rubbers (for example, IR, BR, SBR, CR, NBR, IIR, EPM, EPDM, acrylic rubber, EVA, urethane rubber, silicone rubber, and fluororubber) and thermoplastic elastomers (for example, of styrene, olefin, vinyl chloride, ester, amide, and urethane series). These processability-improving polymers may be used in the amount of up to 100 parts by weight, preferably up to 50 parts by weight, and most preferably up to 30 parts by weight, per 100 parts by weight of a partially cross-linked butyl rubber. However, the presence of other rubbers dilutes desirable properties of butyl rubber.

RU 2,130,948 discloses the copolymerization of isobutylene with DVB in an aromatic or aliphatic hydrocarbon solvent initiated with a system comprising $TiCl_4$ and triisobutylaluminum. The content of DVB in the monomer feed was 0.1 to 5.0 wt. %, based on isobutylene. The process was carried out in the temperature range −40 to +40° C. The products had low molecular weights ($M_v$<15,000 g/mol) and were useful as a source for preparing glues. In one example, the process was carried out at +40° C. and the viscosity average molecular weight of the polymer was about 5400 g/mol. This is different from the process described in the present invention, where a typical polymerization temperature was −95° C. and the viscosity average molecular weight of the product was above 200,000 g/mol. The above application did not involve the presence of a chain-transfer agent in the monomer feed during polymerizations.

Co-Pending Canadian Application CA-2,316,741 discloses terpolymers of isobutylene, isoprene, divinyl benzene (DVB) prepared in the presence of a chain-transfer agent, such as diisobutylene, which are substantially gel-free and have an improved processability. However, the above application is silent about applications for sealants and adhesives.

Co-Pending Canadian Application CA 2,386,628 discloses peroxide curable compounds comprising terpolymers of isobutylene, isoprene, divinyl benzene (DVB) prepared in the presence of a chain-transfer agent, such as diisobutylene, which are substantially gel-free and have an improved processability but is also silent about compounds for sealants/adhesives. In the above two applications, an aliphatic conjugated diene, like isoprene, was an integral part of the compounds.

SUMMARY OF THE INVENTION

The present invention provides a substantially-gel free compound comprising:

a. at least one elastomeric polymer without any conjugated aliphatic diene in its composition having an average molecular weight $M_n$ of more than 20,000 g/mol and comprising repeating units derived from at least one $C_4$ to $C_7$ isomonoolefin monomer and at least one multiolefin cross-linking agent and at least one chain transfer agent, said polymer containing less than 15 wt. % of solid matter insoluble in boiling cyclohexane under reflux for 60 min, b. at least one filler and c. optionally at least one diluent especially useful for the manufacture of shaped articles for sealants and/or adhesives.

Another aspect of the invention is a self-supporting shaped article comprising said compound optionally layered on or interposed between one or more supporting means.

Yet another aspect of the invention is a tape comprising said substantially gel-free compound optionally layered on or interposed between one or more supporting means.

Yet another aspect of the invention is an adhesive composition comprising said substantially gel-free compound.

Yet another aspect of the invention is a sealant composition comprising said substantially gel-free compound.

DETAILED DESCRIPTION OF THE INVENTION

The present invention relates to butyl-type polymers. The terms "butyl rubber", "butyl polymer" and "butyl rubber polymer" are used throughout this specification interchangeably. While the prior art in using butyl rubber refers to polymers prepared by reacting a monomer mixture comprising a $C_4$ to $C_7$ isomonoolefin monomer and a $C_4$ to $C_{14}$ multiolefin monomer or β-pinene, this invention specifically relates to elastomeric polymers comprising repeating units derived from at least one $C_4$ to $C_7$ isomonoolefin monomer, optionally further copolymerizable monomers, at least one multiolefin cross-linking agent and at least one chain transfer agent, which due to the lack of multiolefin monomer/conjugated aliphatic diene or β-pinene in the monomer mixture have no double bonds in the polymer chains.

In connection with this invention the term "substantially gel-free" is understood to denote a polymer containing less than 15 wt. % of solid matter insoluble in cyclohexane (under reflux for 60 min), preferably less than 10 wt. %, in particular less than 5 wt %.

The present invention is not restricted to any particular $C_4$ to $C_7$ isomonoolefin monomers. Preferred $C_4$ to $C_7$ monoolefins are isobutylene, 2-methyl-1-butene, 3-methyl-1-butene, 2-methyl-2-butene, 4-methyl-1-pentene and mixtures thereof. The most preferred $C_4$ to $C_7$ isomonoolefin monomer is isobutylene.

Even more, the present invention is not restricted to any particular multiolefin cross-linking agent. Preferably, the multiolefin cross-linking agent is a multiolefinic hydrocarbon compound. Examples of these are norbornadiene, 2-isopropenylnorbornene, 5-vinyl-2-norbornene, 1,3,5-hexatriene, 2-phenyl-1,3-butadiene, divinylbenzene, diisopropenylbenzene, divinyltoluene, divinylxylene or $C_1$ to $C_{20}$ alkyl-substituted derivatives of the above compounds. More preferably, the multiolefin crosslinking agent is divinylbenzene, diisopropenylbenzene, divinyltoluene, divinylxylene or $C_1$ to $C_{20}$ alkyl substituted derivatives of said compounds. Most preferably the multiolefin cross-linking agent is divinylbenzene or diisopropenylbenzene.

Even more, the present invention is not restricted to any particular chain transfer agent. However, the chain transfer agent should preferably be a strong chain transfer agent—i.e., it should be capable of reacting with the growing polymer chain, terminate its further growth and subsequently initiate a new polymer chain. The type and amount of chain transfer agent is dependent upon the amount of multiolefin cross-linking agent. At low concentrations of multiolefin cross-linking agent low amounts of chain transfer agent and/or a weak chain transfer agent can be employed. As the concentration of the multiolefin crosslinking agent is increased, however, the chain transfer agent concentration should be increased and/or a stronger chain transfer agent should be selected. Use of a weak chain transfer agent should be avoided because too much can decrease the polarity of the solvent mixture and also would make the process uneconomical. The strength of the chain transfer agent may be determined conventionally—see, for example, J. Macromol. Sci.-Chem., A1(6) pp. 995-1004 (1967). A number called the transfer constant expresses its strength. According to the values published in this paper, the transfer constant of 1-butene is 0. Preferably, the chain transfer agent has a transfer coefficient of at least 10, more preferably at least 50. Non-limiting examples of useful chain transfer agents are piperylene, 1-methylcycloheptene, 1-methyl-1-cyclopentene, 2-ethyl-1-hexene, 2,4,4-trimethyl-1-pentene, indene and mixtures thereof. The most preferred chain transfer agent is 2,4,4-trimethyl-1-pentene.

Preferably the monomer mixture to be polymerized comprises in the range of from 75% to 99.98% by weight of at least one $C_4$ to $C_7$ isomonoolefin monomer, in the range of from 0.01% to 15% by weight of a multifunctional cross-linking agent, and in the range of from 0.01% to 10% by weight of a chain-transfer agent. More preferably, the monomer mixture comprises in the range of from 82% to 99.9% by weight of a $C_4$ to $C_7$ isomonoolefin monomer, in the range of from 0.05% to 10% by weight of a multifunctional cross-linking agent, and in the range of from 0.05% to 8% by weight of a chain-transfer agent. Most preferably, the monomer mixture comprises in the range of from 90% to 99.85% by weight of a $C_4$ to $C_7$ isomonoolefin monomer, in the range of from 0.1% to 5% by weight of a multifunctional cross-linking agent, and in the range of from 0.05% to 5% by weight of a chain-transfer agent. It will be apparent to the skilled in the art that the total of all monomers will result in 100% by weight.

The monomer mixture may contain one or more additional polymerizable co-monomers, provided, of course, that they are copolymerizable with the other monomers in the monomer mixture. For example, the monomer mixture may contain a small amount of a styrenic monomer like p-methylstyrene, styrene, α-methylstyrene, p-chlorostyrene, p-methoxystyrene, indene (including indene derivatives) and mixtures thereof. If present, it is preferred to use the styrenic monomer in an amount of up to 5.0% by weight of the monomer mixture. The values of the $C_4$ to $C_7$ isomonoolefin monomer(s), and/or crosslinking agent, and/or chain-transfer agent will have to be adjusted accordingly to result again in a total of 100% by weight.

The present invention is not restricted to a special process for preparing/polymerizing the monomer mixture. This type of polymerization is well known to the skilled in the art and usually comprises contacting the reaction mixture described above with a catalyst system. Preferably, the polymerization is conducted at a temperature conventional in the production of butyl polymers—e.g., in the range of from −100° C. to +50° C., more preferably at temperatures below −40° C., most preferable at temperatures below −50° C. The polymer may be produced by polymerization in solution or by a slurry polymerization method. Polymerization is preferably conducted in suspension (the slurry method)—see, for example, Ullmann's Encyclopedia of Industrial Chemistry (Fifth, Completely Revised Edition, Volume A23; Editors Elvers et al., 290-292).

The inventive polymer preferably has a Mooney viscosity ML (1+8@125° C.) in the range of from 2 to 40 units, more preferably in the range of from 4 to 35 units.

As an example, in one embodiment the polymerization is conducted in the presence of an inert aliphatic hydrocarbon diluent (such as n-hexane) and a catalyst mixture comprising a major amount (in the range of from 80 to 99 mole percent) of a dialcylaluminum halide (for example diethylaluminum chloride), a minor amount (in the range of from 1 to 20 mole percent) of a monoalkylaluminum dihalide (for example isobutylaluminum dichloride), and a minor amount (in the range of from 0.01 to 10 ppm) of at least one of a member selected from the group comprising water, aluminoxane (for example methylaluminoxane) and mixtures thereof. Of course, other catalyst systems conventionally used to produce butyl polymers can be used to produce a butyl polymer which is useful herein—see, for example, "Cationic Polymerization of Olefins: A Critical Inventory" by Joseph P. Kennedy (John Wiley & Sons, Inc. © 1975, 10-12).

Polymerization may be performed both continuously and discontinuously. In the case of continuous operation, the process is preferably performed with the following three feed streams:
  I) solvent/diluent+isomonoolefin(s) (preferably isobutene) and optionally additional co-monomers,
  II) multifunctional cross-linking. agent(s) and chain-transfer agent(s),
  III) catalyst.

In the case of discontinuous operation, the process may, for example, be performed as follows: The reactor, precooled to the reaction temperature, is charged with solvent or diluent and the monomers. The initiator is then pumped in the form of a dilute solution in such a manner that the heat of polymerization may be dissipated without problem. The course of the reaction may be monitored by means of the evolution of heat.

The compound further comprises at least one active or inactive filler. The filler may be in particular:
  highly dispersed silicas, prepared e.g. by the precipitation of silicate solutions or the flame hydrolysis of silicon halides, with specific surface areas of in the range of from 5 to 1000 m$^2$/g, and with primary particle sizes of in the range of from 10 to 400 nm; the silicas can optionally also be present as mixed oxides with other metal oxides such as those of Al, Mg, Ca, Ba, Zn, Zr and Ti;
  synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;
  natural silicates, such as kaolin and other naturally occurring silica;
  glass fibers and glass fiber products (matting, extrudates) or glass microspheres;
  metal oxides, such as zinc oxide, calcium oxide, magnesium oxide and aluminum oxide;
  metal carbonates, such as magnesium carbonate, calcium carbonate and zinc carbonate;
  metal hydroxides, e.g., aluminum hydroxide and magnesium hydroxide;
  carbon blacks; the carbon blacks to be used here are prepared by the lamp black, furnace black or gas black process and have preferably BET (DIN 66 131) specific surface areas in the range of from 20 to 200 m$^2$/g, e.g., SAF, ISAF, HAF, EF or GPF carbon blacks;
  rubber gels, especially those based on polybutadiene, butadiene/styrene copolymers, butadiene/acrylonitrile copolymers and polychloroprene;

or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the tetrapolymer. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Bayer AG.

It might be advantageous to use a combination of carbon black and mineral filler in the inventive compound. In this combination the ratio of mineral fillers to carbon black is usually in the range of from 0.05 to 20, preferably 0.1 to 10. For the rubber composition of the present invention it is usually advantageous to contain carbon black in an amount of in the range of from 20 to 200 parts by weight, preferably 30 to 150 parts by weight, more preferably 40 to 100 parts by weight.

The compound optionally further comprises at least one diluent. The diluent is intended to reduce the viscosity of the compound and preferably evaporates after the compound is in its final position. The term "diluent" expressly includes solvents of the polymer component or the whole compound. The invention is not limited to a special diluent. For example, aromatic or cyclic hydrocarbons such as toluene and cyclohexane or aliphatic hydrocarbons such as hexane are suitable. Preferred diluents for the polymer component are aliphatic and cyclic hydrocarbons. Usually the amount of diluent in the compound is in the range of from 0 to 200 phr (=per hundred rubber), preferably from 0 to 150 phr.

In cases where the compound is intended for application as a hot-melt, there is little or preferably no diluent present in the compound.

Even if it is not preferred, the compound may further comprise other natural or synthetic rubbers such as BR (polybutadiene), ABR (butadiene/acrylic acid-$C_1$-$C_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR (partially or totally hydrogenated NBR-rubber), EPDM (ethylene/propylene/diene-copolymers), FKM (fluoropolymers or fluororubbers), and mixtures of the given polymers.

The rubber composition according to the invention can contain further auxiliary products for rubbers, such as reaction accelerators, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Generally, the self-adhesive rubber composition according to the present invention does not contain tackifying agents. However, it may be advantageous for certain applications to use such tackifying agents. Petroleum resins are often used for this purpose. These resins are frequently produced by polymerization of a mixture of a distillate obtained by petroleum cracking that normally boils in the range from 25° C. to 80° C., and a monovinyl aromatic monomer with 8 to 9 carbon atoms in proportions such as to form a resin that contains 5 to 15 wt. % of the monovinyl aromatic compound measured by means of nuclear resonance analysis (NMR).

The distillate obtained from the petroleum cracking comprises a mixture of saturated and unsaturated monomers, the unsaturated monomers being monoolefins and diolefins, and some higher and lower materials such as $C_6$ olefins and diolefins may be present, although the unsaturated materials are predominantly $C_5$ olefins. The distillate may also contain saturated or aromatic materials that may act as polymerization solvents.

Further tackifying resins include terpene resins as well as those resins that are formed in the polymerization of unsaturated $C_5$-$C_9$ hydrocarbon monomers. Examples of commercially available resins based on a $C_5$ olefin fraction of this type are the tackifying resins Wingtack™ 95 and 115 (Goodyear Tire and Rubber Co., Akron, Ohio). Other hydrocarbon resins include Regalrez™ 1078 and 1126 (Hercules Chemical Co. Inc., Wilmington, Del.), Arkon™ resins such as Arkon™ P115 (Arakawa Forest Chemical Industries, Chicago, Ill.) and Escorez™ resins (Exxon Chemical Co., Houston, Tex.). Suitable terpene resins include terpene polymers such as polymeric resin-containing materials that are obtained by the polymerization and/or copolymerization of terpene hydrocarbons such as alicyclic, monocyclic and bicyclic monoterpenes and their mixtures. Commercially available terpene resins include the Zonarezm terpene resins of the B Series and 7000 Series (Arizona Chemical Corp., Wayne, N.J.). The tackifying resin may be ethylenically unsaturated, although saturated tackifying resins are preferred for those applications in which resistance to oxidation is important. Also suitable are the coumarone-indene resins marketed by Rhein Chemie, Germany, under the trade name Rhenosin® (Rhenosin® types: C 10, C 30, C 90, C 100, C 110, C 120, C 150), hydrocarbon resins (Rhenosine®types: TP 100, TT 10, TT 30, TT 90, TT 100, TD 90, TD 100, TD 110), phenolic resins (Rhenosin® types: P 9447 K, P 7443 K, P 6204 K) as well as bitumen resins (Rhenosin® types: 145 and 260).

These resins are normally used in an amount in the range from 0.1 to 150 parts by weight per 100 parts of butyl polymer.

The ingredients of the final compound are mixed together, suitably at an elevated temperature that may range from 25° C. to 200° C. Normally the mixing time does not exceed one hour and a time in the range from 2 to 30 minutes is usually adequate. The mixing is suitably carried out in a suitable mixing means, preferably an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

Furthermore, the invention provides a self-supporting shaped article comprising said compound optionally layered on or interposed between one or more supporting means.

Self-supporting shaped articles without supporting means are 3-dimensional articles such as sheets, pellets, sticks, films or beads.

Yet another aspect of the invention is a tape comprising said substantially gel-free compound optionally layered on or interposed between one or more supporting means.

For this application, the inventive self-adhesive rubber composition is applied to the preferably primed surface of a suitable supporting means (i.e. substrate). As a rule the layer thickness of the rubber composition is in the range from 6 to 250 μm, in particular 10 to 100 μm. Preferred substrates are polyolefins such as LDPE, HDPE, PP, BOPP, polyurethanes, polyethylene terephthalates, PVC, ABS, polycarbonates, polyamides and polyesters.

The priming material is, for example, a neutralized hydrogenated colophony. By priming the substrate with this composition, the adhesive remains firmly adherent to the latter, even after the substrate composite has been applied to a surface. The primer composition according to the present invention produces a highly polar surface to which the self-adhesive composition can adhere.

Types of colophony that are suitable for the primer composition include polar colophony that contains acidic groups. Colophony that is at least partially hydrogenated is preferred. Commercially available colophony includes Foral™ AX hydrogenated colophony, Dresinol™ 205 colophony and Staybeliterm hydrogenated colophony (all from Hercules Chemical Co.), as well as Hypale™ colophony (Arakawa). Acid-containing colophony is highly polar and may be used in the present self-adhesive composition also as a surface-active agent and/or tackifying agent.

However, this type of colophony is used as a primer in order to improve the adherence of the rubber composition to the substrate.

In order to neutralize the acid-containing colophony, the latter is, for example, reacted with a solution of a basic compound that can form a metal salt on reaction with the colophony. Suitable bases include alkali metal hydroxides (e.g. LiOH, NaOH, KOH) and alkaline earth metal hydroxides (e.g. $Ca(OH)_2$, $Mg(OH)_2$). On account of their solubility properties, alkali metal hydroxides, in particular KOH and NaOH, are preferred. Such hydroxides may be dissolved in a polar solvent such as water.

In order to react the colophony and the basic compound, both substances are as a rule dissolved in a solvent, preferably a polar solvent (because these compounds tend to exhibit polarity), most preferably water. The substances are then allowed to undergo an acid-base reaction. Since such reactions normally occur spontaneously, no special measures (for example elevated temperature or elevated pressure) are necessary, although they may be employed if desired. Normally stoichiometric amounts of colophony and base (or a slight excess of base) are used.

The neutralized colophony may optionally be mixed with an elastomeric compound before being applied to the substrate. Preferably, the elastomeric compound is highly compatible with the organic part of the colophony and with a saturating agent used in the tape substrate. Also, the elastomer is preferably dispersible in water. Since many substrates that are available contain crepe paper saturated with an acrylate polymer or with a styrene-butadiene rubber (styrene-butadiene rubber=SBR) and since acrylates and SBRs are compatible with the organic part of most types of hydrogenated colophony, they are preferred types of elastomers.

SBRs are known in the art and can be obtained from various suppliers. Common examples include Butofan™ NS209, NS222, NS 155 and NS248 rubber (BASF Corp., Parsippany, N.J. and Perbunan™ latices from Polymer Latex GmbH & Co. KG, Germany). Other suitable polymers include nitrile rubber such as the Hycar™ polymer series (B.F. Goodrich Co., Akron, Ohio) and (meth)acrylate polymers. Also suitable as elastomers are carboxylated NBR, HNBR and liquid NBR types, for example Therban® VBKA 8889, Krynac® K.X. 7.40, K.X. 7.50, K.X. 90 and K.E. 34.38 from Bayer AG.

A mixture of a rubber-based emulsion polymer, a colophony-based surface-active agent and a colophony-based tackifying agent is described in U.S. Pat. No. 5,385,965 (Bernard, et al.).

The list of suitable rubber-based polymers includes carboxylated statistical styrene-butadiene copolymers. Foral™ AX colophony compounds are included in the list of suitable tackifying resins.

If an elastomeric component together with a neutralized colophony is used in the primer, the two components may be mixed in any ratio in the range from 0.01:99.99 to 75:25, though a ratio of 50:50 (by weight) is preferred. (Other ranges are also suitable depending on the coating process that is employed.) The mixing is effected simply by adding the elastomer to the neutralized aqueous colophony mixture. The mixture can then be diluted to a desired concentration for coating. Preferred concentrations are in the range from 5 to 25 wt. %, more preferably in the range from 10 to 20 wt. %.

A preferred primer composition for a tape substrate saturated with SBR may be produced by neutralizing Foral™ AX colophony with an approximately stoichiometric amount of a strong base (for example an aqueous solution of KOH) in water at elevated temperature (e.g. 88° C.). After the neutralized colophony mixture has been removed from the heat source, it is combined with an approximately equal amount (by weight) of Butofan™ NS209 SBR and the resulting mixture is diluted in water to a solids content of about 15%. Also preferred are priming compositions with a minor amount of double bonds, such as ethylene-vinyl acetate copolymers with vinyl acetate contents below 40 wt. %, ethylene-α-olefin copolymers or ethylene-α-olefin-diene terpolymers.

The priming composition and/or the self-adhesive composition can be applied to a substrate (for example a tape substrate) by many different methods, including solvent coating, solvent spraying, emulsion coating, low pressure coating or other processes known to the person skilled in the art. Suitable substrates include polyolefin films (e.g. polyethylene and polypropylene films), in particular corona-treated polyolefin films, and paper saturated with elastomer. The suitable coating weight is in the range from 0.1 to 5 mg/cm$^2$, preferably from 0.2 to 1.0 mg/cm$^2$, and more preferably from 0.3 to 0.5 mg/cm$^2$. When the priming layer has been applied to a substrate, it is then preferably dried. This drying preferably takes place at elevated temperature, under reduced pressure, or both.

A further preferred method for the production of coated substrates is co-extrusion coating, which is normally carried out in a coating device with a melt film of the self-adhesive composition that is melted in an extruder and is applied via a flat-sheeting die to a substrate that may consist of one or more polymer layers. The composite that is thereby formed is then cooled in a cooling/press roll unit and smoothed. The composite strip material is then coiled in a corresponding coiling machine.

In the furthermore preferred lamination process the procedures of application of the coating composition to the carrier strip, smoothing and cooling, and stripping and coiling are carried out in a similar manner to the coating process. In the actual extrusion lamination, a prefabricated carrier strip is fed into a calender roll frame with 4 rollers. In this case, the carrier strip is coated before the first roller gap with a melt film that is melted in an extruder and applied via a flat-sheeting die. A second prefabricated strip is fed in before the second roller gap. The composite material that is, thereby formed, is smoothed on passing through the second roller gap, then cooled, stripped, and coiled in a coiling unit. These so-called cast films may be pretreated to improve the range of the composite bonding (carrier film/self-adhesive composition). The PO carrier film is typically either subjected to a corona oxidation or is coated with a silicone layer.

According to the furthermore preferred blowing/flat-sheeting die extrusion process, the inventive composition in dry form and various polymers are generally first of all melted in different extruders under suitable conditions and are then combined in the form of melt streams with the formation of a multilayer melt stream in the extrusion apparatus. This is followed by the discharge, stripping and cooling of the multilayer molten strip containing the self-adhesive composition and the coiling of the composite material. A composite film is obtained in this way. The flat-sheeting die extrusion process is preferably employed in this connection.

Suitable polymers for these processes include, in particular, thermoplastics such as, for example, polyamides, polystyrene, polyesters, polycarbonates or polyolefins. Polyolefins are preferably used, for example ethylene homopolymers, propylene homopolymers or statistical propylene-ethylene copolymers. The production of such polyolefins may be carried out by conventional types of polymerization known to the person skilled in the art, for example by Ziegler-Natta polymerization, by polymerization with the aid of Phillips catalysts, by high pressure polymerization or by polymerization with the aid of metallocene-containing catalysts.

The coating/extrusion processes are as a rule carried out at temperatures in the range from 170° C. to 300° C., pressures of 250 to 400 bar, and mean transit times of 5 to 20 minutes. Since the copolymers in the melt and in the film have a high tendency to stick to all contact surfaces, it may be advantageous to coat the rollers used for the production of the composites as well as the stripping rollers with a material that is anti-adhesive with respect to the copolymers, for example with polytetrafluoroethylene. In this way appropriate strip tensions for the satisfactory coiling of the composite materials can, for example, be maintained.

The films coated with self-adhesive composition that are obtained in this way can advantageously be used in the coating of glass, wood, ceramics, production of floor coverings or all types of lacquered articles, such as metal, alloys, as well as plastics such as polycarbonate, polyamide, polyester and ABS. Generally such applications are those in which high quality surfaces have to be protected for a certain time.

Yet another aspect of the invention is an adhesive composition comprising said substantially gel-free compound, in particular a hot-melt system.

Yet another aspect of the invention is a sealant composition comprising said substantially gel-free compound in particular a hot-melt system.

The hot melt system is preferably a 100% solids system, where the composition is usually provided in small particles, such as pellets or another shaped article, such as a stick. The shaped article is heated to the softening temperature, preferably 200-215° C., by a suitable means and applied on or between the materials to seal or glue. It might be advantageous to cover the shaped articles with a powdering substance such as a polyolefin powder in order to reduce the tackiness of the shaped article and to ensure that the articles won't stick together after transport to the customer.

Self-supporting shaped articles, such as tapes are especially useful in architectural work and for insulating glass sealing. Hot melt systems comprising the inventive compound are especially useful as insulation sealants for glass windows and doors. Further areas of application include: building/construction, bridges, roads, transport, woodworking and wood bonding, bookbinding, graphic industry, packaging industry, disposable articles, laminates, shoe manufacture, end customer adhesive applications, and in the sealant and insulating industry.

The compound of the invention is permanently tacky, remains flexible, and is especially recommended for internal or non-exposed applications.

The present invention will be further illustrated by the following examples.

EXAMPLES

Methyl chloride (Dow Chemical) serving as a diluent for polymerization and isobutylene monomer (Matheson, 99%) were transferred into a reactor by condensing a vapor phase. Aluminum chloride (99.99%), isoprene (99%) and 2,4,4-trimethyl-1-pentene (99%) were from Aldrich. The inhibitor was removed from isoprene by using an inhibitor removing disposable column from Aldrich. Commercial divinylbenzene (ca. 64%) was from Dow Chemical.

The Mooney viscosity test was carried out according to ASTM standard D-1646 on a Monsanto MV 2000 Mooney Viscometer.

The solubility of a polymer was determined after the sample refluxed in cylohexane over 60-minute period.

The stickness (adhesion) of the polymer was measured using a Tel-Tak apparatus (Monsanto Company, Model TT-1). The test measured a force to separate a specimen from the metal surface (a polished stainless steel). The specimens were cut into 1/4"×2" strips reinforced with fabric backing. They were placed in the instrument at a right angle to the metal strip thus defining the area of contact. The contact time was 30 sees and the contact pressure was 16 ounces. A small gear motor provided 1 inch/minute movement of the lower platen automatically when the dwell time interval was completed. The force to separate the two surfaces was measured by a force gauge with a built-in stop that left the pointer at the maximum reading.

Example 1

Comparative

A sample of commercial XL-10000 terpolymer was tested.
The Mooney viscosity of the rubber was 61.2 units (ML 1'+8'@ 125° C.) and the content of a soluble fraction was 24.7 wt. %.

The force to separate a rubber specimen from stainless steel in a Tel-Tak test was 3 lb/in².

Example 2

Comparative

A sample of commercial butyl rubber Bayer® Butyl 301 was tested.
The Mooney viscosity of the rubber was 51.0 units (ML 1'+8'@ 125° C.) and the rubber was totally soluble in cyclohexane.

The force to separate a rubber specimen from stainless steel in a Tel-Tak test was 11 lb/in².

Example 3

To a 50 mL Erlenmeyer flask, 0.45 g of $AlCl_3$ was added, followed by 100 mL of methyl chloride at −30° C. The resulting solution was stirred for 30 min at −30° C. and then cooled down to −95° C., thus forming the catalyst solution.

To a 2000 mL glass reactor equipped with an overhead stirrer, 900 mL of methyl chloride at −95° C. were added, followed by 120.0 mL isobutylene at −95° C. and 2.0 mL of commercial DVB at room temperature. Also, 2.25 mL of 2,4,4-trimethyl-1-pentene was added to the reaction feed. The reaction mixture was cooled down to −95° C. and 10.0 mL of the catalyst solution was used to start the reaction.

The reaction was carried out in MBRAUN® dry box under the atmosphere of dry nitrogen. The reaction was terminated after 10 minutes by adding into the reaction mixture 10 mL of ethanol containing some sodium hydroxide.

The obtained polymer was steam coagulated and dried on a 6"×12" mill at ca. 105° C. followed by drying in a vacuum oven at 50° C. to a constant weight.

The yield of the reaction was 87.4%. The Mooney viscosity of the rubber was 4.5 units (ML 1'+8'@ 125° C.) and the content of a soluble fraction was 99.0 wt. %.

The force to separate a rubber specimen from stainless steel in a Tel-Tak test was 24 lb/in².

The invention claimed is:

1. A substantially gel-free compound comprising:
   a. at least one elastomeric polymer having an average molecular weight $M_n$ of more than 20,000 g/mol and a Mooney viscosity in the range of 2 to 40 units, comprising repeating units derived from at least one $C_4$ to $C_7$ isomonoolefin monomer, at least one multiolefin crosslinking agent and at least one chain transfer agent, said polymer containing less than 15 wt.% of solid matter insoluble in boiling cyclohexane under reflux for 60 min, said polymer not comprising a multiolefin monomer, a conjugated diene or a beta-pinene,
   b. at least one filler and
   c. optionally at least one diluent.

2. The compound of claim 1, wherein at least one of said elastomeric polymer(s) is partially vulcanized.

3. The compound of any of the claims 1-2, wherein the compound further comprises a diluent.

4. A tape comprising the compound of claim 1 and optionally one or more supporting means.

5. A sealant or adhesive composition comprising the compound of claim 1.

6. A self-supporting shaped article comprising a substantially gel-free compound comprising:
   a. at least one elastomeric polymer having an average molecular weight $M_n$ of more than 20,000 g/mol comprising repeating units derived from at least one $C_4$ to $C_7$ isomonoolefin monomer, at least one multiolefin crosslinking agent and at least one chain transfer agent, said polymer containing less than 15 wt.% of solid mailer insoluble in boiling cyclohexane under reflux for 60 min said polymer not comprising a multiolefin monomer, a conjugated diene or a beta-pinene,
   b. at least one filler.

7. An article according to claim 6, wherein the $C_4$ to $C_7$ isomonoolefin monomer(s) are selected from the group consisting of isobutylene, 2-methyl-1-butene, 3-methyl-1-butene, 2-methyl-2-butene, 4-methyl-1-pentene and mixtures thereof.

8. An article according to any of claims 6-7, wherein the article further comprises at least one supporting means on which the compound is layered.

* * * * *